Oct. 6, 1942.  C. E. COCHRAN  2,298,196
LOAD TRANSPORTING, SLEWING, AND TIERING DEVICE
Filed Sept. 11, 1940  4 Sheets-Sheet 1

INVENTOR.
CLYDE E. COCHRAN
BY
ATTORNEY.

Oct. 6, 1942.    C. E. COCHRAN    2,298,196
LOAD TRANSPORTING, SLEWING, AND TIERING DEVICE
Filed Sept. 11, 1940    4 Sheets-Sheet 2

INVENTOR.
CLYDE E COCHRAN
BY Fay, Gobrick, Williams & Fay
ATTORNEY.

Oct. 6, 1942.    C. E. COCHRAN    2,298,196
LOAD TRANSPORTING, SLEWING, AND TIERING DEVICE
Filed Sept. 11, 1940    4 Sheets-Sheet 3
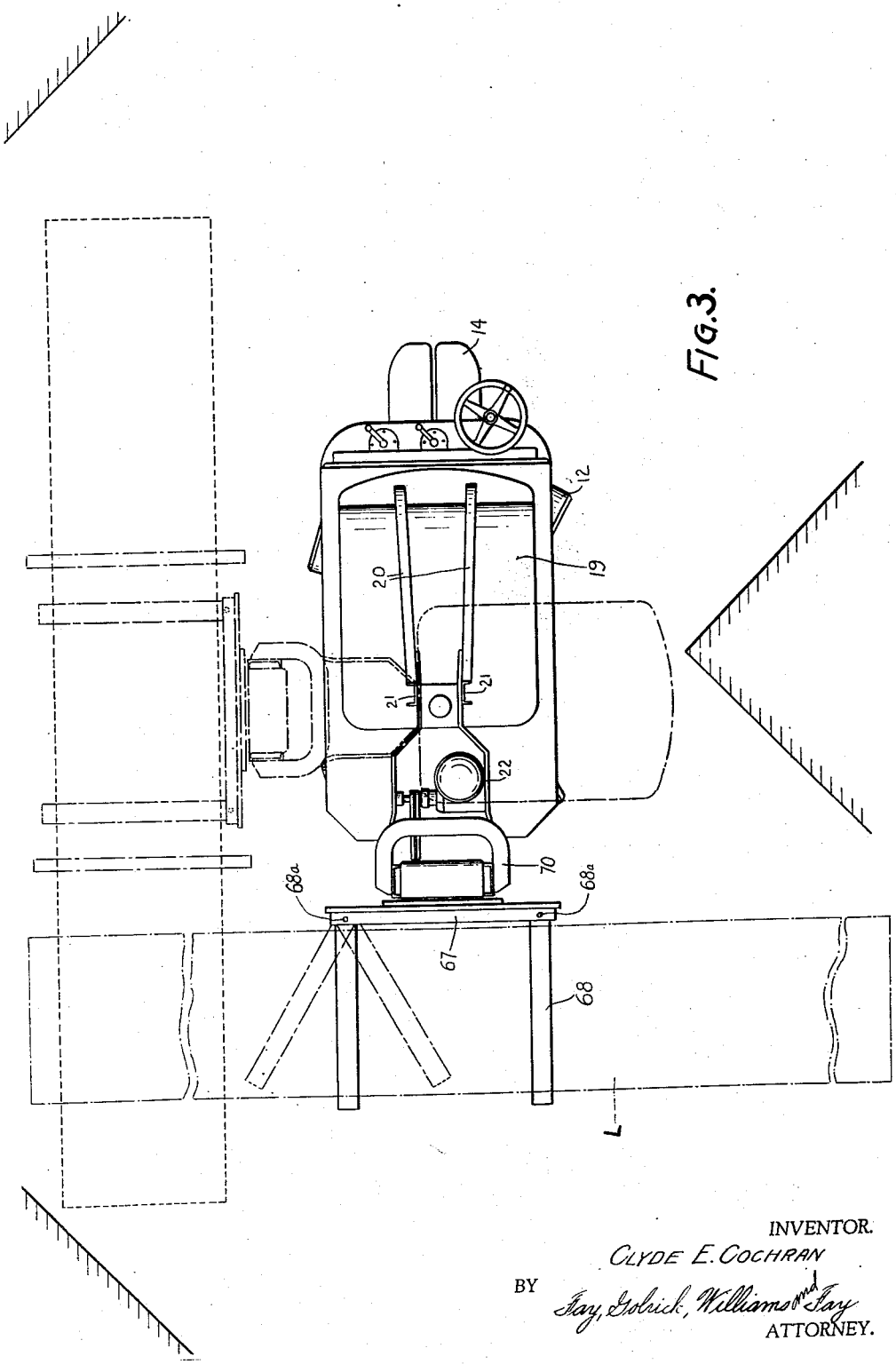
INVENTOR.
CLYDE E. COCHRAN
BY
ATTORNEY.

Oct. 6, 1942.   C. E. COCHRAN   2,298,196
LOAD TRANSPORTING, SLEWING, AND TIERING DEVICE
Filed Sept. 11, 1940   4 Sheets-Sheet 4
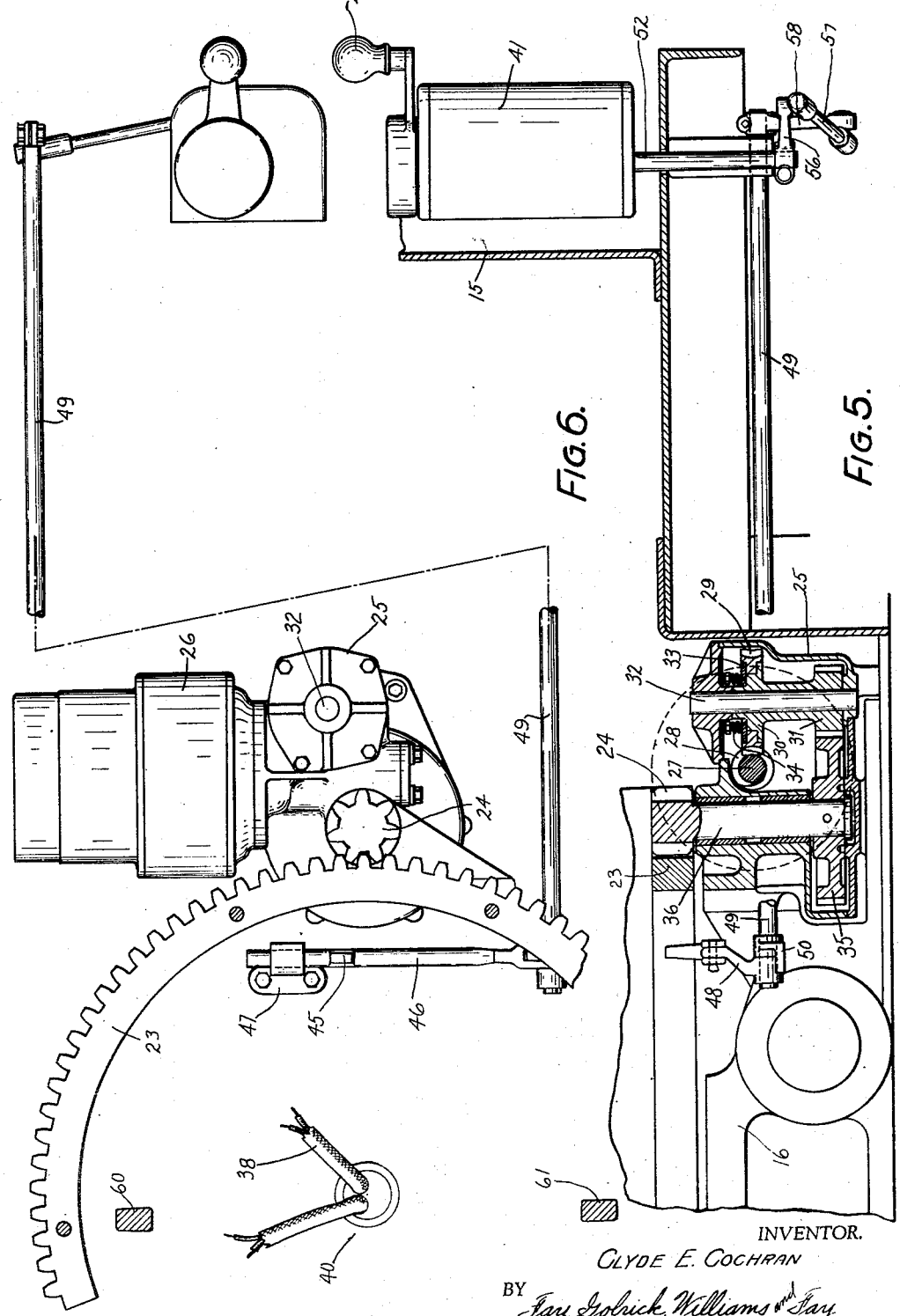
INVENTOR.
CLYDE E. COCHRAN
BY Fay, Golrick, Williams and Fay
ATTORNEY.

Patented Oct. 6, 1942

2,298,196

UNITED STATES PATENT OFFICE 2,298,196

LOAD TRANSPORTING, SLEWING, AND TIERING DEVICE

Clyde E. Cochran, Cleveland, Ohio, assignor to The Elwell-Parker Electric Company Application September 11, 1940, Serial No. 356,323

8 Claims. (Cl. 214—112)

This invention is concerned with industrial trucks and more particularly industrial trucks adaptable for the lifting, tiering, and carrying of elongated loads.

The general object of the invention is the provision of an industrial truck which may be either gas engine or electric powered and is particularly adaptable to the lifting, transporting, and stacking of elongated loads such as piping, lumber, metal bars, etc. in narrow aisles or narrow spaces of transportation.

A more specific object of the present invention is the provision of an industrial truck which combines the features of a crane type and tier lift type of load elevating and handling mechanism whereby an elongated load may be handled by engagement of the same near the middle or center of gravity thereof by convenient maneuvering of the truck and thereafter the load may be elevated to a transportable position and slewed substantially 90° to a position longitudinally of the truck and immediately adjacent the side thereof and be transported while so positioned.

A further object of the present invention is the provision of an industrial truck provided with a swivel or crane base mechanism mounted centrally of the truck body and which mechanism is provided with a lifting mechanism and both of which mechanisms are such as to be controllable from the operator's position upon the truck and arranged relative to the truck so as to permit such maneuverability that the load supporting members of the truck can be withdrawn from beneath a load when in confined spaces.

Other objects of the present invention will become apparent from the following description which refers to the accompanying drawings illustrating an embodiment of the invention. The essential characteristics of the invention are summarized in the claims. In the drawings:

Fig. 3 is a plan view of the truck showing the relation thereof when handling a load relative to aisle spaces in which the truck is operating;

Fig. 5 is a cross-sectional elevational view of part of the controller mechanism of the truck;

Fig. 6 is a plan view of the mechanism shown in Fig. 5; and

Fig. 7 is a wiring diagram showing the connections between the source of power, the motors and controllers therefor.

In my Patent 1,413,575 I disclosed and claimed a combined industrial truck tractor and dolly truck arrangement whereby elongated loads such as piping, lumber, etc. could be transported in narrow aisles and which arrangement necessiated the manual placing of the load upon the dolly truck piece by piece. The present invention contemplates the handling of similar loads and the arrangement of the mechanism is such that all manual handling of such loads is eliminated. The mechanism comprises an industrial truck and, as illustrated, the truck and associated mechanism are actuated by electric power derived from storage batteries which are mounted upon a slewing base of the load handling mechanism to serve as a counter balance to an overhanging tiering mechanism. An electric motor for operating the tiering mechanism is mounted adjacent thereto upon the slewing frame of the truck and the motor for effecting the swinging or slewing of the load handling mechanism is mounted upon the frame of the truck.

Figure 1:
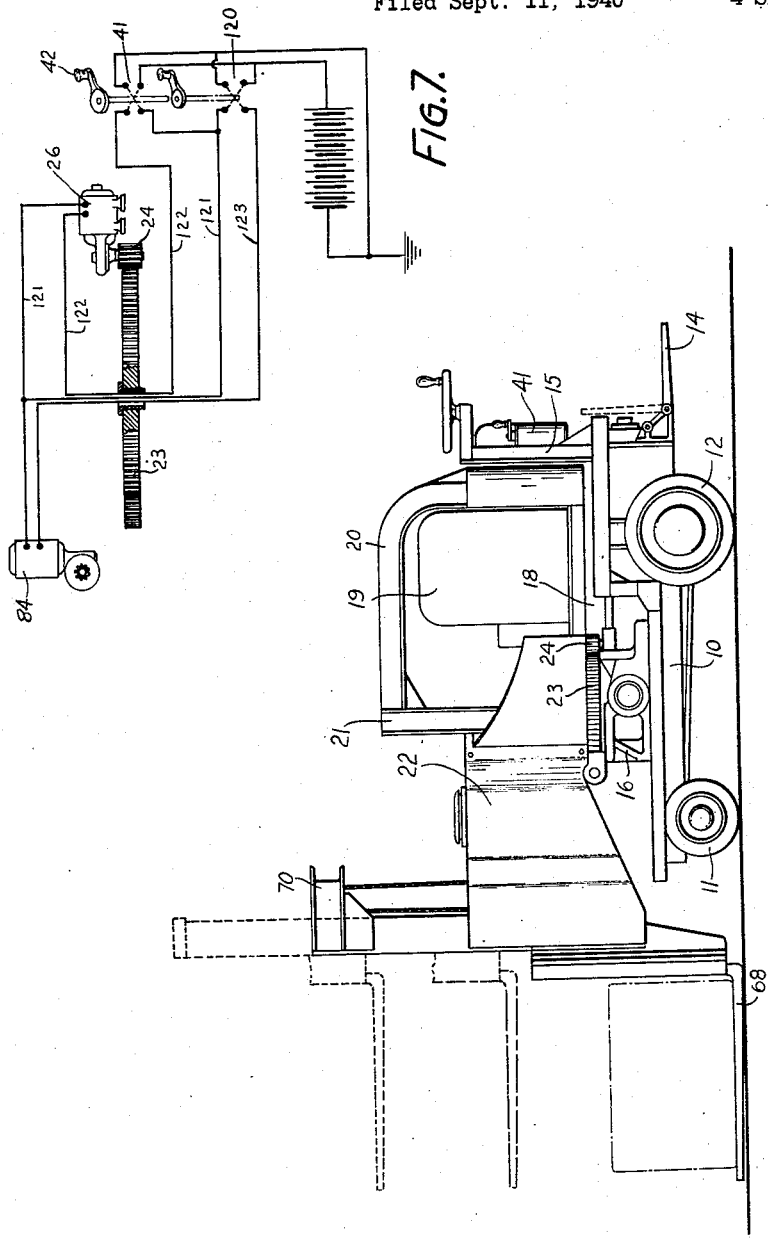
Fig. 1 is a side elevation of an industrial truck embodying the features of my new invention.
Figure 2:
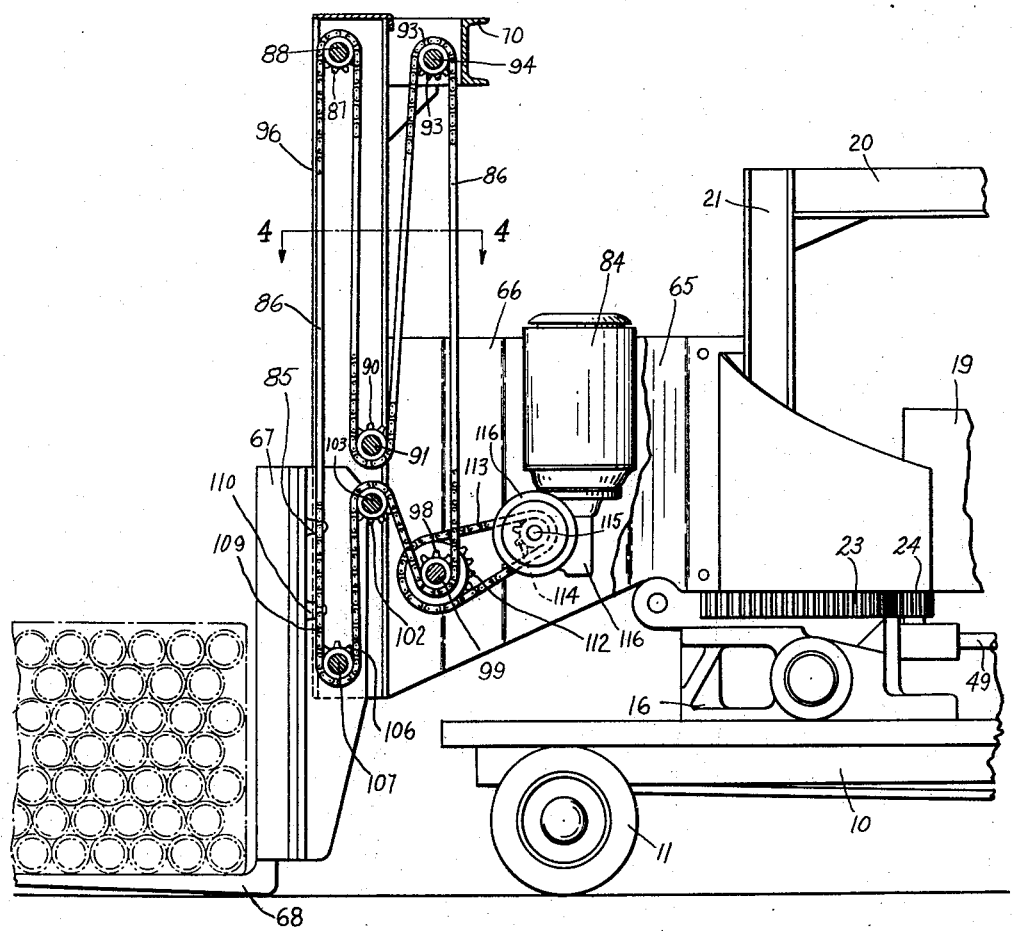
Fig. 2 is an enlarged cross-sectional elevation of the load handling end of the truck and associated mechanism shown partly in cross-section.
Figure 4:
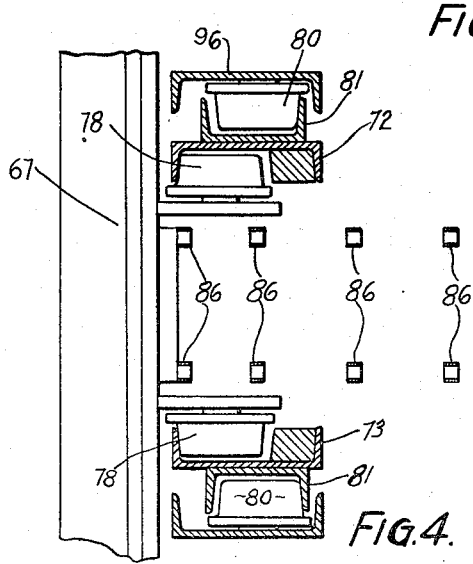
Fig. 4 is a cross-sectional view taken substantially along the line 4—4 of Fig. 2.

Referring particularly to Figs. 1, 2, and 3 of the drawings I show such a truck as comprising a chassis structure 10 having forward wheels 11 and traction wheels 12 of small diameter, the traction wheels 12 being dirigible. If desired, all four wheels may be dirigible and such a tiering arrangement can be provided in a well-known manner to those skilled in the industrial truck art. At the rear end of the truck an operator's platform 14 is provided and mounted upon upwardly extending frame members 15 are truck steering and controlling mechanisms as well as controller mechanisms for operating the slewing motor as well as the tiering mechanism motor. Intermediate the forward and rearward pairs of wheels a base frame or casting 16 is positioned upon the truck chassis 10 and which comprises a pivot block or bearing for a slewing frame comprising a platform structure 18 supporting a battery housing 19, an overhead truss structure 20, uprights 21 and plate members 22 which support the tiering mechanism.

Secured to the underside of the platform structure is a ring gear 23 which is revolved or slewed by a pinion 24. The pinion 24 comprises part of a gear reduction mechanism (see Fig. 5) supported by and encased in a suitable housing 25 attached to the base or frame manner 16 and the housing 25 supports a motor 26. The shaft 27 of the motor 26 carries a worm 28 which drives a worm gear 29. The worm gear 29 is frictionally carried by a hub formation 30 formed on a sleeve gear 31 which is supported by a stub shaft 32 carried by the housing 25. A friction plate 33 engages one face of the worm gear 29 through the influence of spring members 34 to cause the worm gear 29 to drive the sleeve gear 31. The sleeve gear 31 drives a gear member 35 carried by the shank or shaft 36 of the ring gear driving pinion 24.

The motor 26 is connected to the batteries within the housing 19 through a flexible cable or conduit 38 which extends from the motor upwardly through the center of the pivot or king pin mechanism generally indicated at 40 about which the slewing apparatus is revolved by the motor 26. The circuits carried by the cable 38 are extended forwardly to a controller box or reversible switch mechanism 41 mounted upon an end frame structure 15 of the truck, the controller or switch mechanism being manipulated by a manual lever 42.

It will be noted that the ring gear 23 is not continuous in its formation but extends in excess of 180° whereby the load handling mechanism may be swung to a position immediately adjacent either side of the truck. To prevent an overrunning action of the pinion 24 upon the ring gear 23, a kick-out mechanism is provided which will shift the switch mechanism 41 to a neutral or open position. This mechanism may comprise an upwardly extending lug 45 carried by or formed upon a slidable bar 46 mounted immediately beneath or within the ring gear 23. The bar 46 is supported adjacent one end thereof by a bracket 47 and the other end thereof is yoke attached to an upwardly extending arm 48. The arm 48 is mounted upon the end of a longitudinally extending rod 49 which is supported by a bracket 50, the brackets 47 and 50 being mounted upon the pivot base or member 16. The longitudinally extending rod 49 extends rearwardly to a position adjacent the operator's position on the truck and terminates immediately below the controller or switch mechanism 41. The switch mechanism (not shown) is mounted upon a vertically extending shaft 52 to which the controller lever 42 is secured and which extends downwardly and is connected to a longitudinally shiftable rod 49 by an arm 56, a cross rod 57, and an arm 58, the latter being secured to the end of the rod 49. Two depending lugs 60 and 61 carried by the platform or ring mounting are so positioned as to contact the lug 45 if the ring gear be operated more than 90° to either the right or the left of the center line of the truck, thus causing the bar 46 to operate the longitudinal rod 49 and the controller shaft 52 in an obvious manner.

The tier lifting mechanism may comprise a supporting frame preferably formed of trussed plate members 65 and 66 which may be secured to and extend from the frame structure 20—21 outwardly to such position as to support fixed uprights or elevator members 96 in overhanging relation to the forward end of the truck whereby a load elevating carriage 67 with the load engaging members 68 may be lowered to the floor or truck supporting surface and may be elevated to a substantial height to permit one load after another to be stacked or tiered.

The arms 68 have individual pivotal connections to the carriage 67 to facilitate withdrawing the arms from beneath a load which is resting upon closely spaced dunnage strips and such pivotal connection may comprise, if desired, the mechanism shown in my application Ser. No. 275,833, filed May 26, 1939. The present drawings merely indicate conventionally a pivot mechanism 68a.

The particular tiering mechanism shown is of the telescopic type but the telescopic feature comprises no part of the present invention. Generally, the tiering mechanism comprises the upright frame members 96 which are rigidly connected by a top frame member 70 and inner telescopically arranged frame members 72 and 73. The load carriage 67 is provided with upper rollers 76 and a pair of lower rollers (not shown) which ride upon the flanges of the channel member 72 and 73. The upright members 96 are provided with roller members 80 which are mounted thereon and which engage the flanges of angle members 81 secured to the backs of the channel members 72 and 73.

Elevation of the carriage 67 is effected by pairs of chain stretches 86 which are driven by a motor 84 mounted upon the frame plate 65 and 66 in the following manner. The ends of the chain members 86 are attached to the rear face of the frame of the carriage 67 at 85. The chain members 86 extend upwardly and pass over a pair of sprockets 87 carried on a shaft 88. The pair of chains then extend downwardly and pass over a pair of sprockets 90 carried by a shaft 91, then extend upwardly and pass over a pair of sprockets 93 carried by a shaft 94 supported by the frame member 70. The chain members then extend downwardly and pass over a pair of sprockets members 98 mounted upon a shaft member 99 which may be supported by the frame plates 65 and 66. The chain members then extend upwardly and pass over sprockets 102 carried by a shaft 103 and then downwardly and pass over sprocket members 106 mounted upon shaft 107. The lower ends of the pair of chain members are secured to spring members 109 which are attached at 110 to the rear face of the carriage structure 67. The shaft 99 is driven by a sprocket 112 over which passes a chain 113 driven by a sprocket pinion 114. The sprocket pinion 114 is mounted upon a gear shaft 115 which supports a worm gear (not shown) within a casing 116 attached to the motor 84. The worm gear within the casing is driven by a worm carried on the end of the shaft of the motor 84.

Control of the motor 84 is effected by cable members extending from batteries within the housing 19, the conduits first extending through the king pin construction 40 to a controller or switch disposed at the operator's position and then through the king pin structure to the motor 84 whereby operation of the motor is controllable at any slewed position of the steering or load elevating mechanism.

Referring particularly to Fig. 7 it will be noted that the controller 120 for operating the elevator or tiering mechanism motor 84 comprises primarily a reversible switch connected in the line 123 for reversing the flow of power in the windings of the motor whereby the motor can be reversed as desired. The controller 41 for the slewing motor 26 is also reversible through the circuit comprising the lines 121—122. Both of these circuits extend from the batteries within the power housing downwardly through the pivot mechanism or pivot connection between the slewing apparatus and the base member 16 to the controllers. There is a return line extending upwardly through the pivot mechanism to the motor 84. The safety mechanism for automatically operating the controller 41 to thereby limit the action of the motor 26 in slewing a load in either direction has been described and it will be understood by those skilled in the art that limit mechanism for controlling a kick-out switch in the line to the tiering motor 84 is included in the apparatus although not shown in the drawings.

In operation load engaging members 68 will be in the position shown in full lines in Fig. 3, that is, in parallel relation to the truck whereby the operator may approach an elongated load or crate or frame containing the same, in the usual manner by having the load engaging members 68 positioned adjacent the floor or truck supporting surface so that when the truck is advanced forwardly toward the load the members 68 will be positioned beneath the load. Operation of the motor 84 through its controller at the operator's position on the truck, will then cause the carriage 67 to be raised thus elevating the load to any desired height within the lifting limits of the tiering mechanism. The operator may elevate the load for turning or slewing purposes only or may maneuver the truck to obtain sufficient clearance to permit slewing of the load as shown by dotted lines in Fig. 3 to the side of the truck whereby the load will extend parallel with the truck. A load of lumber or piping of standard lengths can be maneuvered around a narrow aisle turn as illustrated in Fig. 3 and can be transported and turned in aisle space heretofore too narrow to permit such efficient load handling.

When it is desired to elevate and tier or stack a load relative to previously stacked loads and the aisle space is narrow the slewing apparatus is swung to shift the load at an angle relative to the normal side or end position of the load. The load then can be elevated and the truck maneuvered so that the load will be positioned over a stack of previously deposited loads. The load is then lowered upon spacing blocks, then by maneuvering the truck the load bearing arms 68 can be removed from beneath the load by slewing the same while moving the truck. In like manner, loads can be engaged when in a pile or stack and lowered and transported. In some instances the load can be elevated from a position at the side of the truck upwardly above the stack and thereafter the truck can be maneuvered to bring the load into stacking relationship to previously stacked loads. Withdrawal of the arms 68 can then be effected as above described. The operation of the entire truck including the power drive for the truck, the steering apparatus for the truck and the motors which operate the load slewing and elevating mechanism can all be disposed at the operator's end of the truck whereby all maneuvering of the truck and manipulation of the load in the manner described can be effected without necessitating the operator leaving his position upon the truck.

It will be apparent also to those skilled in the art that the electrical conduits associated with the pivotal construction of the apparatus may comprise contact rings and brushes instead of the twistable cables.

I claim:

1. In an industrial truck, the combination of a truck frame, a pivot mounting for a load slewing apparatus mounted upon the truck frame, a load slewing apparatus pivotally mounted thereon comprising a power housing structure arranged in counterbalanced relation to a load tiering mechanism, means associated with said pivot mounting for turning the load slewing apparatus in two directions, said load lifting mechanism comprising an upright frame, a load elevating carriage operatively mounted thereon and positioned to overhang the end of the truck frame and a hoisting mechanism driven by a motor all of which are arranged in counter balanced relation to the power housing structure and controller mechanism located adjacent the operator's position at one end of the truck frame for controlling the motor and for controlling the means for swinging the slewing apparatus.

2. In an industrial truck, the combination of a truck frame, a pivotal base for a load slewing apparatus permanently mounted upon the truck, a load slewing apparatus pivotally mounted thereon including a ring gear and comprising a power housing structure arranged in counterbalanced relation to a load lifting and tiering mechanism overhanging the truck frame, a pinion meshing with the ring gear and associated with said pivot mounting for turning the load slewing apparatus in two directions, said load lifting mechanism comprising an upright frame supporting a load elevating carriage operatively mounted thereon and a hoisting mechanism driven by a motor, all of which are arranged in counterbalanced relation to the power housing structure and whereby elongated loads may be raised while at the end of the truck frame and swing to either side of the truck frame for transportation purposes.

3. In an industrial truck, the combination of a truck frame, a pivot structure for a load slewing apparatus carried by the truck frame, a load lifting, tiering and slewing apparatus pivotally mounted thereon comprising a power housing structure arranged in counterbalanced relation to a load tiering mechanism, a motor and reduction gearing including a pinion associated with said pivot mounting for turning a ring gear on the load slewing apparatus in two directions, said load lifting mechanism comprising a relatively fixed upright frame, a telescoping frame carried by the fixed frame, a load elevating carriage operatively mounted on the telescopic frame and a hoisting mechanism for operating the carriage and driven by a motor, all of which tiering mechanism is arranged in counterbalanced relation to the power housing structure.

4. In an industrial truck, the combination of a truck frame and a load slewing apparatus pivotally mounted upon the truck frame, the load slewing apparatus comprising a counterbalanced structure in the form of a power housing in balanced relation to a tiering and lifting mechanism, a motor carried by the slewing apparatus for operating the load tiering mechanism, a motor mounted on the truck frame for swinging the slewing apparatus and controller mechanisms for said motors located at an operator's position at one end of the truck including power connections extending from the power housing to said motors and passing through the center of the pivotal mounting for the slewing apparatus.

5. In an industrial truck, the combination of a truck frame and a load slewing apparatus pivotally mounted on the truck frame and comprising a counterbalanced structure in the form of a power housing in balanced relation to a load lifting and tiering mechanism said lifting and tiering mechanism being adapted to engage the bottom of a load resting upon the tractive surface of the truck, a motor carried by the slewing apparatus for operating the load lifting and tiering mechanism, motor driven gear mechanism on the truck frame for power swinging the slewing apparatus and controller mechanisms for said motors located at a driver's position at one end of the truck including power cables extending through the pivotal connection between the truck frame and the slewing apparatus.

6. In an industrial truck of the character described, a truck frame, a base structure mounted upon the truck frame at a position intermediate the forward and rearward wheels of the truck, a turnable frame structure pivotally mounted upon the base, said frame structure having mounted thereon a load tiering mechanism, a motor mounted upon said base for driving a pinion which drives a ring gear carried by said turntable frame structure, a source of power comprising storage batteries carried by the turntable frame and mounted to counterbalance the tiering mechanism, electrical connections extending from said battery to said motor, a controller mounted upon the truck at the operator's position including electrical connections extending from the battery to the controller and an over-run stop mechanism associated with the base and the turnable frame structure and mechanically connected to said controller.

7. In an industrial truck of the character described, a truck frame supported by dirigible wheels, a base structure mounted upon the truck frame, intermediate forward and rearward pairs of said wheels, a turnable frame structure pivotally mounted upon the base and adapted to be turned substantially through 180°, said frame structure having mounted thereon a load tiering mechanism which will be in an overhanging relation to the truck frame in any position within said 180°, a motor mounted upon said base, a driving pinion driven by the motor which drives a ring gear secured to the turnable frame structure, a source of power comprising a bank of storage batteries carried by the turnable frame and mounted in counterbalanced relation to the tiering mechanism, an electrical connection extending from said batteries to said motor, a controller mounted upon the truck at the operator's position including an electrical connection extending from the batteries to the controller and an over-run stop mechanism associated with the base and the turnable frame structure and mechanically connected to said controller.

8. In an industrial truck of the character described, a truck frame of the low slung type mounted upon dirigible wheels, a base structure mounted upon the truck frame, intermediate said wheels, a turnable frame structure pivotally mounted upon the base to be swingable through substantially 180°, said frame structure having mounted thereon a load elevating mechanism adapted to extend downwardly to the tractive surface of the truck, a motor mounted upon said base, a ring gear carried by said turnable frame structure driven by said motor, storage batteries carried by the turnable frame mounted to counterbalance the elevating mechanism, electrical connections extending from said battery to said motor including a controller mounted upon the truck at the operator's position and an over-run stop mechanism associated with the base and the turnable frame structure and mechanically connected to said controller.

CLYDE E. COCHRAN.